(12) United States Patent
Kopp et al.

(10) Patent No.: US 8,010,426 B2
(45) Date of Patent: Aug. 30, 2011

(54) APPARATUS AND METHOD FOR FACILITATING TRUSTED BUSINESS INTELLIGENCE

(75) Inventors: Steve Kopp, Paris (FR); Charles Arthur Piercey, Palo Alto, CA (US); Ricardo Polo-Malouvier, Levallois-Perret (FR); Michael Emmett Thompson, Nogent-sur-Marne (FR); Stephen Gary Williams, Avon (FR)

(73) Assignee: Business Objects Software Ltd, Dublin (IE)

( * ) Notice: Subject to any disclaimer, the term of this patent is extended or adjusted under 35 U.S.C. 154(b) by 764 days.

(21) Appl. No.: 11/267,029

(22) Filed: Nov. 4, 2005

(65) Prior Publication Data

US 2007/0106577 A1    May 10, 2007

(51) Int. Cl.
*G06Q 40/00* (2006.01)

(52) U.S. Cl. .......................................... 705/35; 705/500

(58) Field of Classification Search ..................... None
See application file for complete search history.

(56) References Cited

U.S. PATENT DOCUMENTS

| | | | |
|---|---|---|---|
| 2003/0158759 A1* | 8/2003 | Kannenberg | 705/4 |
| 2004/0064335 A1* | 4/2004 | Yang | 705/1 |
| 2004/0111466 A1* | 6/2004 | Beringer et al. | 709/203 |
| 2006/0069658 A1 | 3/2006 | Haller et al. | |
| 2006/0080195 A1 | 4/2006 | Karabulut | |
| 2006/0080256 A1 | 4/2006 | Karabulut | |
| 2006/0136999 A1 | 6/2006 | Kreyscher et al. | |
| 2006/0218405 A1* | 9/2006 | Ama et al. | 713/181 |

* cited by examiner

*Primary Examiner* — Olabode Akintola
(74) *Attorney, Agent, or Firm* — Mintz, Levin, Cohn, Ferris, Glovsky and Popeo, P.C.

(57) ABSTRACT

A computer readable medium includes executable instructions to form a report; process trust values, where each trust value characterizes the accuracy of an attribute of the report; combine trust values to provide an aggregate trust value associated with the report; and supply a user with the report and the aggregate trust value.

10 Claims, 7 Drawing Sheets

APPARATUS AND METHOD FOR FACILITATING TRUSTED BUSINESS INTELLIGENCE

BRIEF DESCRIPTION OF THE INVENTION

This invention relates generally to data storage and retrieval. More particularly, this invention relates to techniques for evaluating the accuracy of business intelligence data.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and, data management systems, such as relational databases or On Line Analytic Processing (OLAP) systems used to collect, store, and manage raw data.

There are a number of commercially available products to produce reports from stored data. For instance, Business Objects Americas of San Jose, Calif., sells a number of widely used report generation products, including Crystal Reports™, Business Objects OLAP Intelligence™, and Business Objects Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. A non-report is an electronic document that is constructed without the automatic retrieval (i.e., in response to computer executable instructions) of information from a data source. Examples of non-report electronic documents include typical business application documents, such as a word processor document, a spreadsheet document, a presentation document, and the like.

Data, commonly manifested in reports, is critical to establishing business strategies and actions. Enterprises increasingly integrate data from a number of sources, such as different databases, external streaming data feeds, and personal spreadsheets. Once this data is integrated it is difficult to determine which values in a report come from which source. In addition, it is not clear how fresh the data may be or if there are validity issues with the data source. Because of these problems, currently, the value of reports is questioned because of concerns regarding the accuracy of the underlying data.

Validation of data within a warehouse or specific data source can add some degree of confidence in the data. This validation, which may be in the form of metadata, is not passed to the report user in a clear and direct manner, so the validation information is often rendered useless in the report generation process.

Even if there are internal standards for evaluating the trustworthiness of a report, Enterprise reporting systems do not effectively link this information with a report. In addition, establishing trust for a report document is often based on the currency (i.e., timeliness) of the data and other factors that may not be possible for a user to determine.

In sum, current software solutions do not address the issue of overall trustworthiness of a report. In particular, current solutions do not meet user needs to aggregate trust levels. Accordingly, it would be desirable to provide a system that overcomes the shortcomings associated with the prior art.

SUMMARY OF THE INVENTION

The invention includes a computer readable medium with executable instructions to form a report; process trust values, where each trust value characterizes the accuracy of an attribute of the report; combine trust values to provide an aggregate trust value associated with the report; and supply a user with the report and the aggregate trust value.

The invention provides a mechanism to store and leverage metadata characterizing the reliability of the content of a report. The report trustworthiness is based on aspects of the report document, such as data currency, data quality, report certification, author certification, and content status. These factors are weighted and aggregated in order to create a custom measure characterizing the trustworthiness of a report.

Trustworthiness indicia is visually presented to the user through various icons, ranging from simplistic color coded icons to graduated scale icons. Embodiments of the invention use default trust value weights that may be configured for a user's needs. An embodiment of the invention allows a user to drill down on a trust value to understand the criteria used to establish its value.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
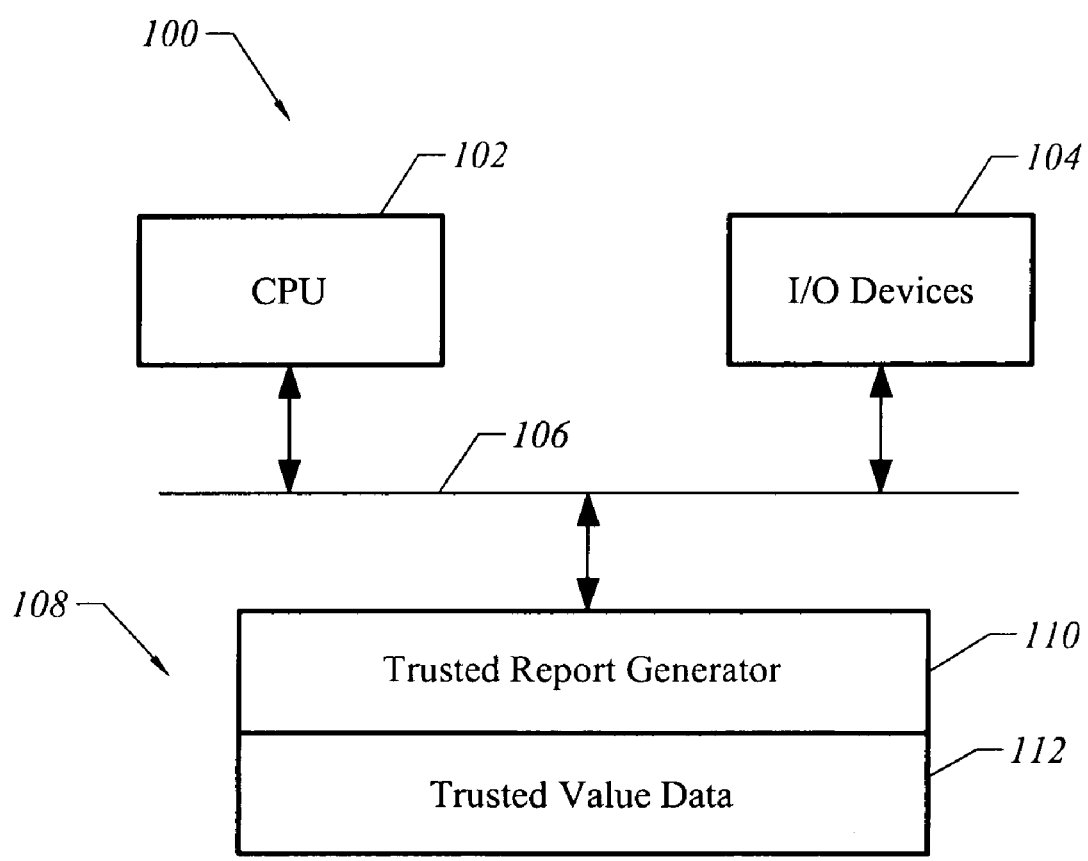
FIG. 1 illustrates a computer configured in accordance with an embodiment of the invention.

FIG. 1 illustrates a computer 100 configured in accordance with an embodiment of the invention. The computer 100 includes standard components, such as a central processing unit 102 connected to a set of input/output devices 104 via a bus 106. The input/output devices 104 may include a keyboard, mouse, monitor, printer, and network connection circuits to facilitate network communications with other computers. A memory 108 is also connected to the bus 106. The memory 108 stores a trusted report generator 110 configured in accordance with an embodiment of the invention. The trusted report generator 110 includes executable instructions to implement operations of the invention, as discussed below. The memory 108 also stores trusted value data 112. As discussed below, the trusted value data 112 is typically in the form of metadata. The trusted value data 112 is processed by the trusted report generator 110 to provide information about the trustworthiness of a report. The trusted value data 112 may be stored on computer 100 or may be accessed over a network if it is resident on another computer within a network, such as shown in FIG. 2.

Figure 2:
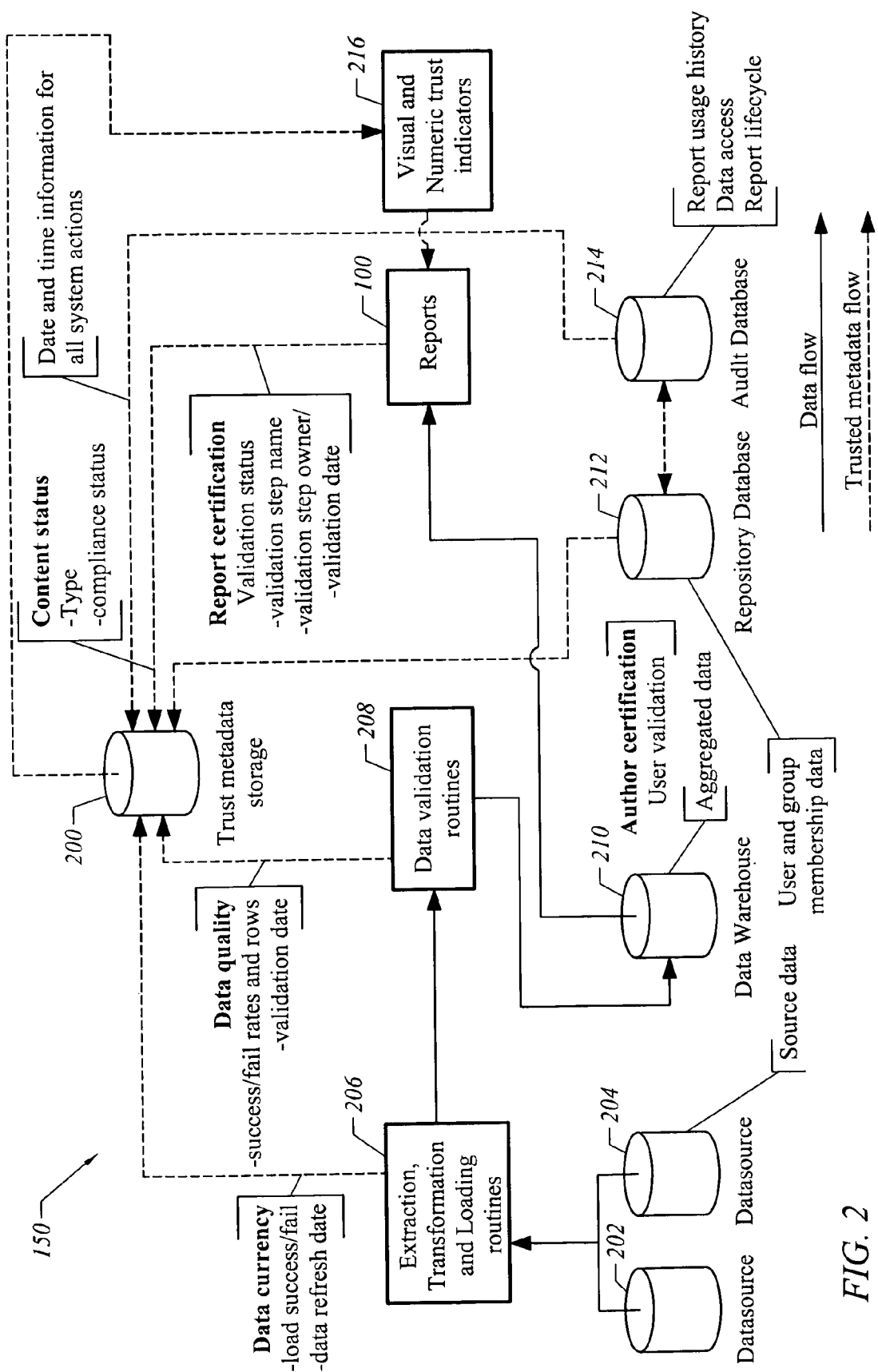
FIG. 2 illustrates a network configured in accordance with an embodiment of the invention.

FIG. 2 illustrates computer 100 operating in a network 150. The trust values are generated throughout the network 150. In this embodiment, the trust values, in the form of trusted metadata, are directed to a trust metadata storage facility 200. The trusted value data 112 may be downloaded from this facility for processing by the trusted report generator 110. The dashed lines of FIG. 2 illustrate trusted metadata flow into the trust metadata storage facility 200, while the solid lines illustrate data flow within the network 150.

The invention utilizes trust values generated throughout a network to ascribe a level of trustworthiness to a report. By way of example, the trust values may be in the form of data currency trust values, data quality trust values, report certification trust values, author certification trust values, and content status trust values. As shown in FIG. 2, these trust values may be generated at various points within a network 150. As discussed below, these trust values may be set by default and/or they may be configured by a user. Further, as discussed below, the trust values are combined to produce an aggregate trust value that is associated with a report. The manner of combining the trust values and the weights associated with the trust values are configurable. In addition, each trust value may be established through a set of components that are individually configurable, as discussed below.

FIG. 2 illustrates extraction, transformation and loading routines 206 accessing data sources 202 and 204. As is known in the art, the process of migrating data from a source (e.g., a database) to a target (e.g., another database, a data mart or a data warehouse) is sometimes referred to as Extract, Transform and Load, or the acronym ETL. Commercially available tools are available to implement ETL routines. The ETL process may be configured to generate data currency metadata, which flows to the trust metadata storage 200. Data currency metadata refers to information that characterizes the timeliness of data. For example, the data currency metadata may provide an indication of the last time data was updated, an origination date for the data, and a refresh date for the data. The data currency metadata may also provide information indicating whether data was successfully loaded during an ETL process.

The data that is subject to the ETL process may be further processed by data validation routines 208. Data that pass validation checks is inserted into a data warehouse 210. The data in the data warehouse 210 may be accessed by the computer 100, along with trusted value data to supply a report with an associated indication of a level of trustworthiness.

The data validation routines 208 may supply additional metadata to the trust metadata storage 200. In particular, the data validation routines 208 may supply data quality trust value metadata. Data quality trust values characterize the accuracy of data. Typically, the data quality trust values are established through the application of validation rules. For example, the data validation rules may establish checks for data consistency, they may identify outlying values, and they may be configured to identify missing values. Thus, for example, the data validation routines 208 may supply metadata characterizing rows of data that failed to be written into the data warehouse 210.

When the computer 100 is operated to have the trusted report generator 110 produce new reports, report certification metadata is supplied to the trust metadata storage facility 200. Report certification information characterizes the accuracy of cumulative data appearing in a report. For example, the accuracy may be characterized based upon such criteria as the use of automatic input, manual inputs, data anomalies, and non-synchronized blocks. Preferably, a report author is also empowered to ascribe a report certification value to a report.

A repository database 212 associated with the computer 100 may be used to generate author certification metadata. An author certification value is a measure of the validity of a report based upon the author of the report. The certification value of an author may be a function of the author's status within an enterprise, the number of trusted reports generated by the author, the total number of reports generated by the author, and various combinations of this criteria. Preferably, each component criterion may be weighted separately. The author certification value is preferably calculated by aggregating individual component weights.

An audit database 214 may also be used to create content status trust information. Content status trust information is a characterization of a report's lifecycle. Thus, for example, this information may include variables considering whether a report is in a development, testing or production phase. This information may also track report usage history and data access history. The content status trust information is also supplied to the trust metadata storage facility 200.

As shown with block 216 of FIG. 2, trust indicators or values flow from the trust metadata storage facility 200 to the computer 100 so that the trusted report generator 110 may generate a report and process trust values associated with the data in the report. The processed trust values may be aggregated to form an aggregate trust value, which is supplied to the user with the report. In addition, the report may include information on the individual trust values.

The composition and weighting of the individual trust values is configurable. In addition, the weighting of components forming an individual trust value is configurable. For example, more weight may be ascribed to trust categories that represent valued trust criteria for a given organization. That is, an organization can customize trust indicators within a system to reflect an organization's internal values, priorities, weightings, and thresholds with respect to trusting data. Thus, for example, some components, such as author certification or report certification may be excluded from the calculation of report trustworthiness within a given organization if these standards are not applicable to the organization's operational workflow.

In one implementation, the default weighting is data currency 40%, data quality 30%, report certification 10%, author certification 10%, and content status 10%. Within each of these categories, component factors may also be weighted. In one implementation, the trust ranking for a report object is one of many trust rankings within a business intelligence system and other factors, such as the overall system, the analytics within the system, the users within the system, and the data cells within the system are also considered.

Figure 3:
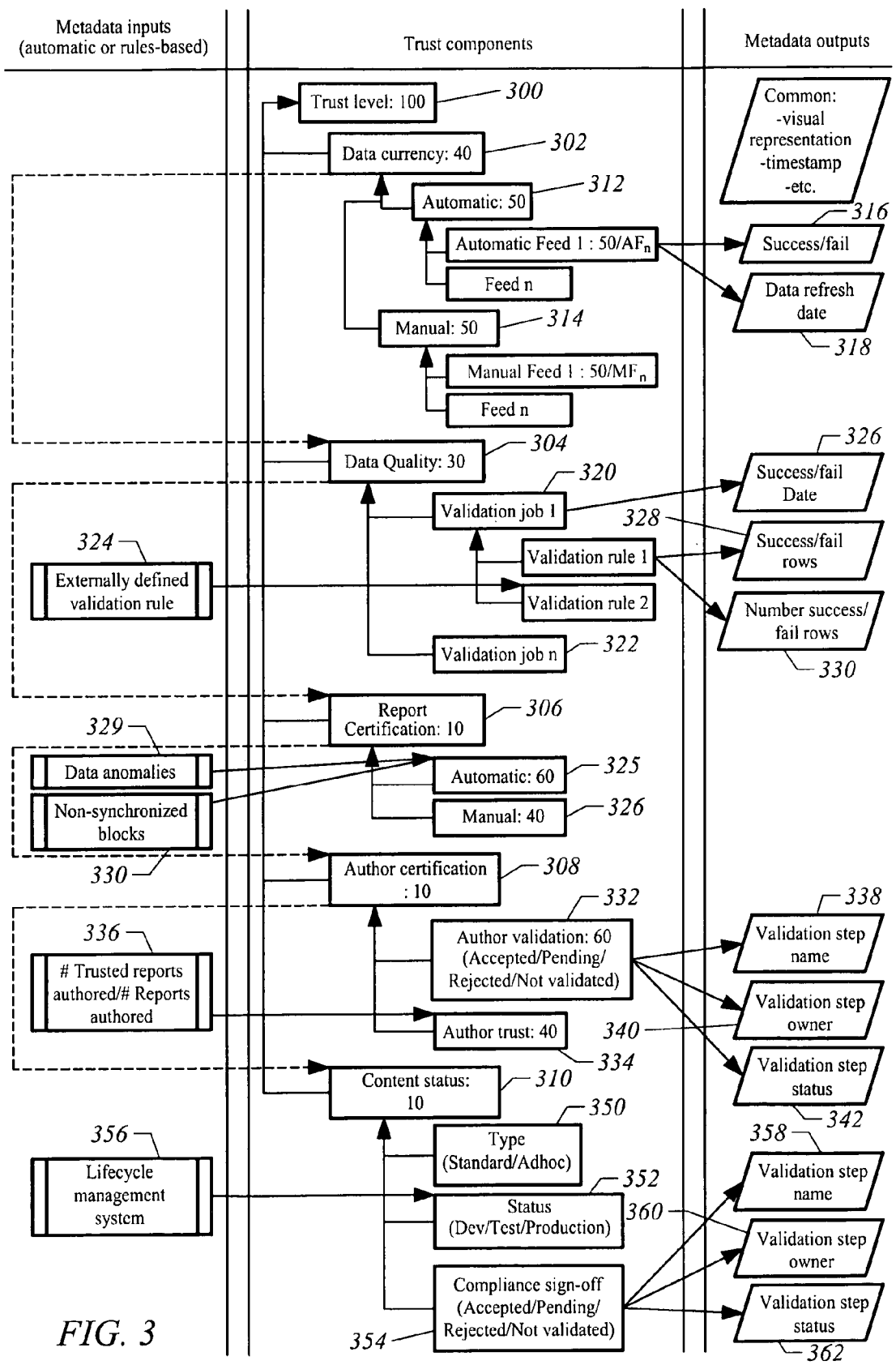
FIG. 3 illustrates trust values that may be utilized in accordance with embodiments of the invention.

FIG. 3 illustrates the use of the foregoing trust components and their respective weightings. The figure also illustrates metadata inputs and outputs associated with the trust components. As shown in block 300 of FIG. 3, there is an aggregate trust value of 100 possible in this example. This trust value is an aggregate trust value based upon a data currency weighting of 40% (block 302), a data quality weighting of 30% (block 304), a report certification weighting of 10% (block 306), an author certification weighting of 10% (block 308) and a content status weighting of 10% (block 310).

FIG. 3 illustrates that the data currency trust value has component weightings of 50% for automatic data feeds (block 312) and 50% for manual data feeds (block 314). These weightings may be set by default or they may be altered by a user.

FIG. 3 illustrates metadata outputs associated with various trust components. Metadata outputs common to all of the trust components include a visual representation of a trust component, a time stamp, and other user configurable data. In the case of the data currency trust value, FIG. 3 illustrates metadata outputs including success/failure information (block 316) and a data refresh date (block 318).

FIG. 3 illustrates that the data quality trust value is a function of various components, such as validation job 1 (block 320) and validation job N (block 322). Each validation job applies a set of validation rules, such as validation rule 1 and validation rule 2 in the case of validation job 1 (block 320). Each validation rule may be specified as an externally defined validation rule forming metadata input (block 324). Metadata outputs associated with the data quality trust value include a success/failure date (block 326), success/failure rows (block 328), and the number of success/failure rows (block 330).

FIG. 3 also illustrates that the report certification trust value 306 may be weighted with individual components. In particular, automatically generated report certification information may be ascribed a 60% weighting (block 325). The automatically generated report certification information may be from metadata inputs, such as those characterizing data anomalies (block 329) and those identifying non-synchronized blocks (block 330). Manual report certification information may be ascribed a 40% weighting (block 326).

The author certification trust value 308 may be calculated using individual components, such as author validation at a 60% weighting (block 332) and author trust weighting of 40% (block 334). The author validation may be based upon such factors as whether the report is accepted, pending, rejected, etc. The author trust component may be based upon such criteria as the number of trusted reports created by the author and the total number of reports created by the author (block 336), which may be supplied as a metadata input. Metadata outputs associated with an author certification value may include a validation step name (block 338), a validation step owner (block 340), and validation step status (block 342).

Finally, FIG. 3 illustrates that the content status trust value 310 may be determined through components, such as content type (block 350), content status (block 352), and compliance sign-off (block 354). The content status may be provided through metadata input from the audit database 214, which constitutes a lifecycle management system (block 356). Metadata outputs associated with a content status value may include a validation step name (block 358), a validation step owner (block 360), and validation step status (block 362).

Figure 4:
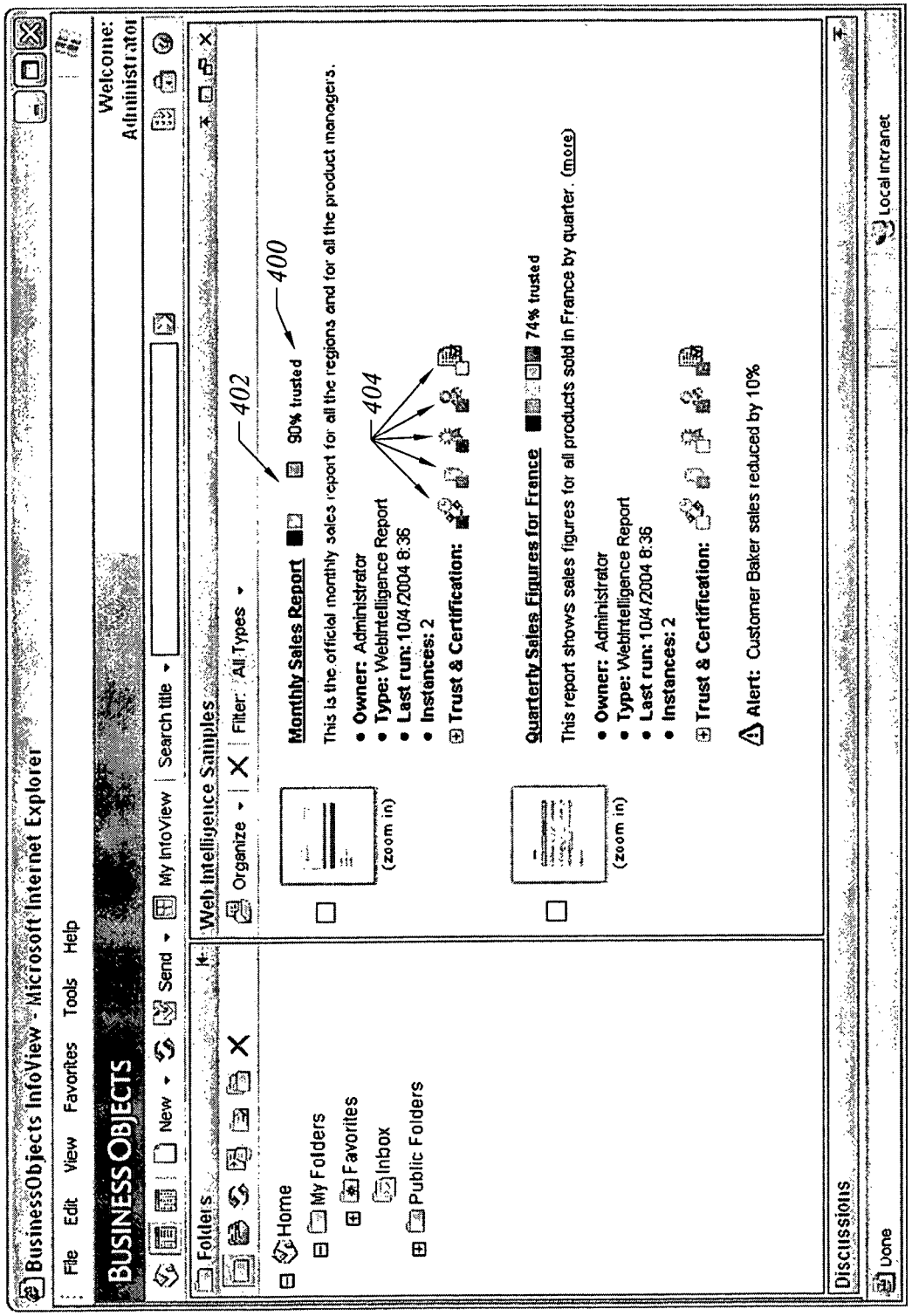
FIG. 4 illustrates trust value information supplied in accordance with an embodiment of the invention.

FIG. 4 illustrates a graphical user interface depicting an overall trust rating for a report, as calculated in accordance with the invention. The overall trust rating includes a numerical indicator 400, a visual indicator of trust rating 402 and visual indicators of trust components 404. In this embodiment, trust is represented using a gradient scale for the overall trust ranking. Specific icons indicate component qualities of trust and are ranked at each level.

Figure 5:
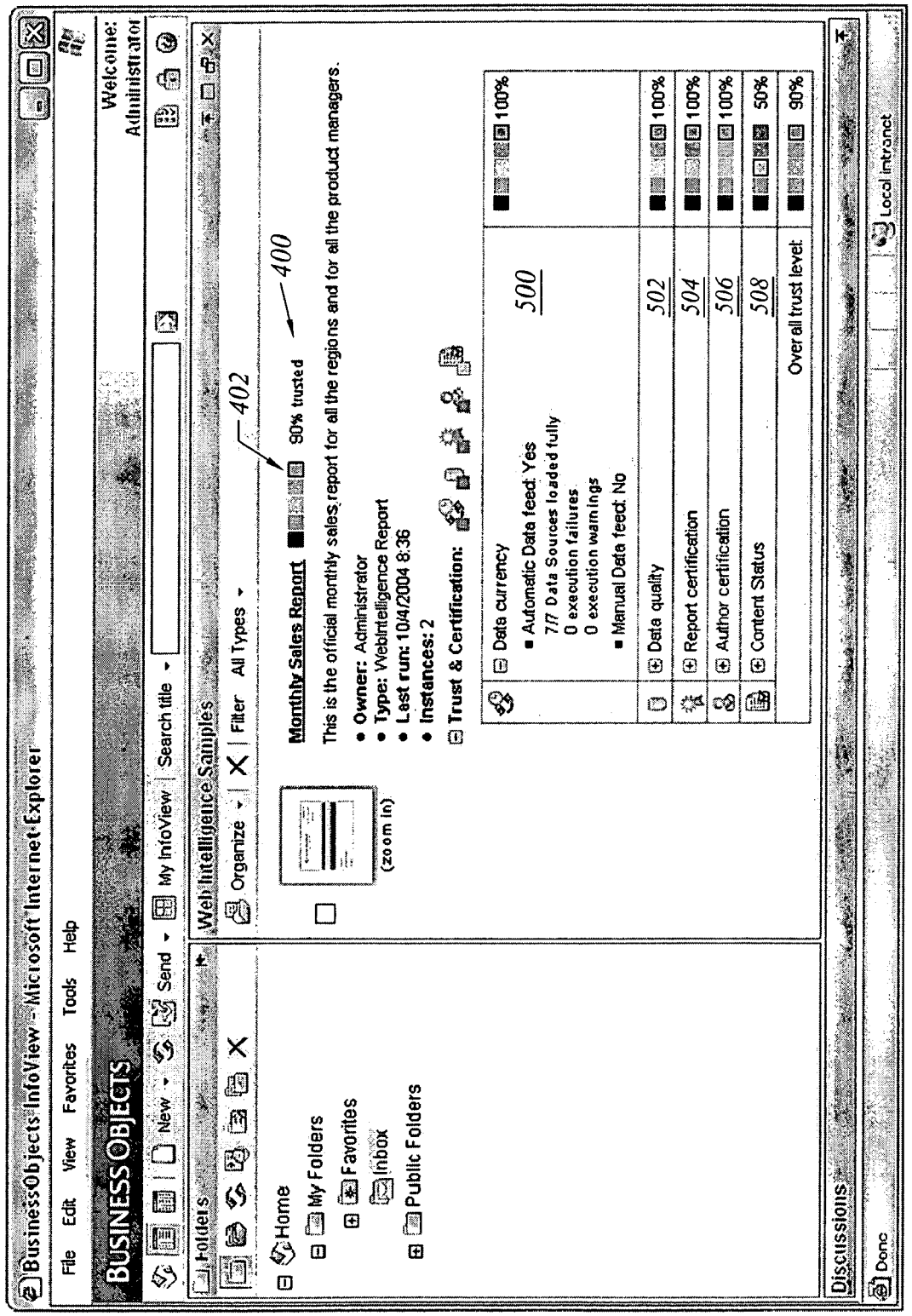
FIG. 5 illustrates trust value information supplied in accordance with another embodiment of the invention.

FIG. 5 illustrates the graphical user interface of FIG. 4, where a component of trust, in this case data currency (block 400), has been expanded to enable the user to see how this trust component was established. Block 500 illustrates that the automatic data feed was enabled, but that the manual data feed was not. The automatic data feed resulted in 717 data sources being fully loaded, with 0 execution failures and 0 execution warnings. The figure also shows an overall trust rating for the other trust components, namely, data quality 502, report certification 504, author certification 506, and content status 508. Each trust component displays both a numeric and visual indicator of trust.

Figure 6:
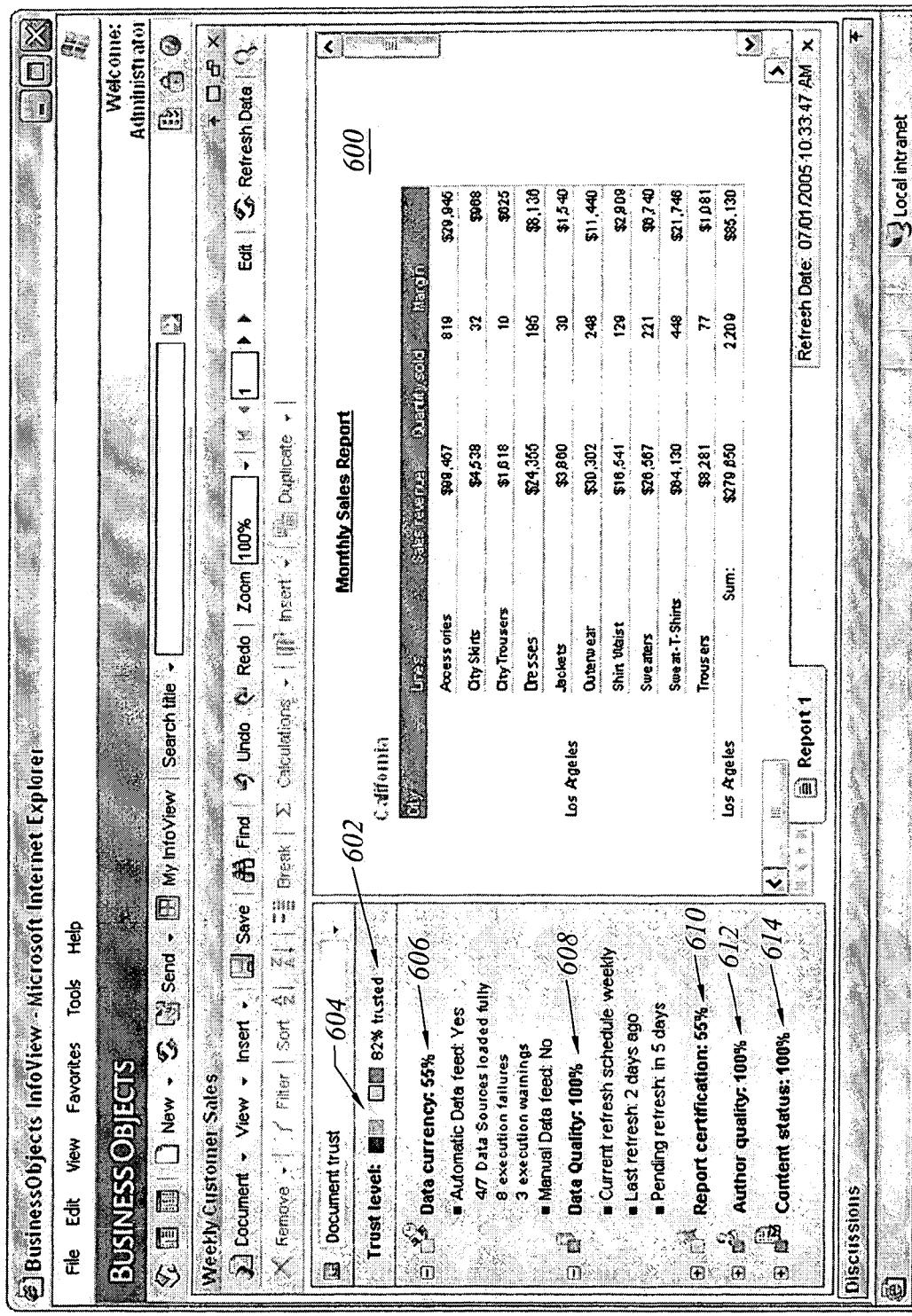
FIG. 6 illustrates trust value information supplied in accordance with still another embodiment of the invention.

FIG. 6 illustrates a report 600 and associated trust information. An overall trust level with a numeric indicator 602 and a visual indicator 604 is supplied. The data currency 606 and data quality components 608 are expanded to provide details on the underlying trust information. The remaining components, report certification 610, author quality 612, and content status 614, have their details collapsed. Only a numeric trust value is supplied for these components.

Figure 7:
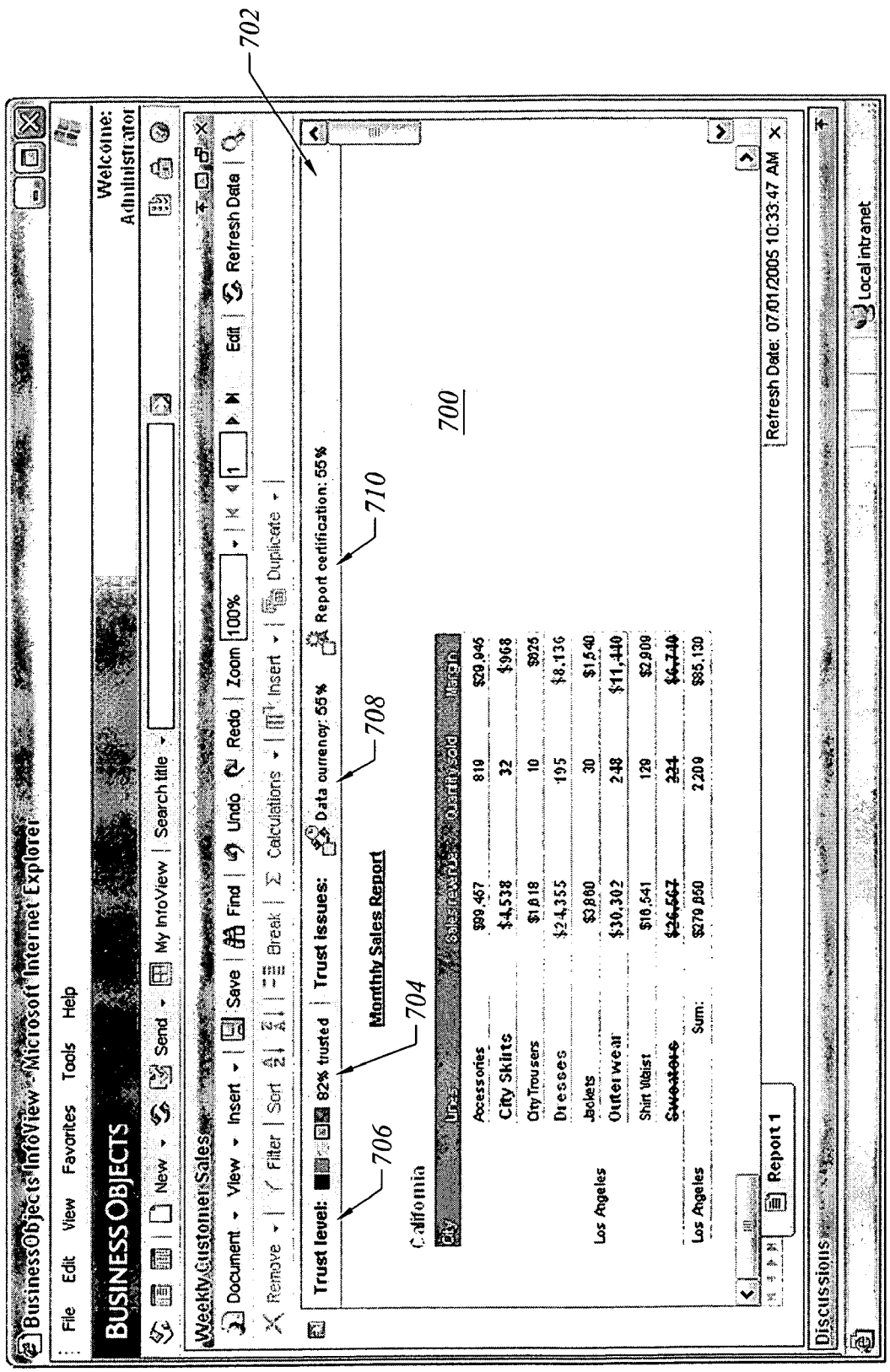
FIG. 7 illustrates trust value information supplied in accordance with another embodiment of the invention.

FIG. 7 illustrates a report 700 with a panel header 702 supplying trust information. In this example, a numeric trust value 704 and a visual indicator 706 are supplied. In this case, relatively low trust values of data currency 708 and report certification 710 are supplied in the panel header 702.

The trustworthiness of a report may be used to trigger various actions. For example, a user may be alerted to a report refresh operation only in the event that an acceptable trustworthiness level is reached. Alternately, a database administrator may be alerted when a refreshed report fails to achieve a specified data quality level. A database administrator may also use trustworthiness values to periodically remove untrustworthy reports from a repository.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium having executable instructions, which when executed on a computer operate to:
    extract, transform and load data from a plurality of source databases into a data warehouse;
    form trust metadata including report certification metadata characterizing the accuracy of data in reports, author certification metadata characterizing the validity of reports based upon the authors of the reports and content status trust information characterizing the life cycles of reports;
    invoke a report generation product to form a report including information automatically retrieved from the data warehouse, where the information is structured in accordance with a report schema;
    access the trust metadata with the report generation product to produce trust values, where each trust value characterizes the accuracy of an attribute of the report;
    combine the trust values to provide an aggregate trust value associated with the report; and
    supply a user with the report and the aggregate trust value.

2. A computer readable storage medium of claim 1 further comprising executable instructions to process the report certification metadata as received metadata from a report generation process.

3. A computer readable storage medium of claim 1 further comprising executable instructions to process the content status trust information as received metadata from a lifecycle management system, wherein the content status trust information characterizes a lifecycle phase comprising at least one of a development phase, a testing phase and a production phase associated with the report.

4. A computer readable storage medium of claim 1 wherein the executable instructions to supply a user include executable instructions to supply a user with the report, the aggregate trust value, and individual trust values.

5. A computer readable storage medium of claim 4 wherein the executable instructions to supply a user include executable instructions to supply a user with a visual metaphor characterizing the aggregate trust value and the individual trust values.

6. A computer readable storage medium of claim 1 further comprising executable instructions to initiate an action alert when selected trust values fail to meet selected criteria.

7. A computer readable storage medium of claim 1 further comprising executable instructions to establish default trust value weights.

8. A computer readable storage medium of claim 1 further comprising executable instructions to configure trust value weights.

9. A computer readable storage medium of claim 8 further comprising executable instructions to configure component factors forming the trust value weights.

10. A computer readable storage medium of claim 1 further comprising executable instructions to facilitate a link between a trust value and underlying data characterizing the trust value.

* * * * *